(12) United States Patent
Liang et al.

(10) Patent No.: US 7,639,487 B2
(45) Date of Patent: Dec. 29, 2009

(54) MOUNTING APPARATUS FOR STORAGE DEVICE

(75) Inventors: Chun-Chi Liang, Tu-Cheng (TW);
Guang-Yao Lee, Taipei Hsien (TW);
Ji-Guo Xu, Shenzhen (CN); Hui Zhang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 162 days.

(21) Appl. No.: 11/309,423

(22) Filed: Aug. 4, 2006

(65) Prior Publication Data

US 2007/0121285 A1    May 31, 2007

(30) Foreign Application Priority Data

Nov. 26, 2005    (CN) .................. 2005 2 0119394

(51) Int. Cl.
*G06F 1/16* (2006.01)
*H05K 5/00* (2006.01)
*H05K 7/00* (2006.01)

(52) U.S. Cl. .................. 361/679.33; 361/679.37
(58) Field of Classification Search ........... 361/685, 361/679.33, 679.37, 679.38, 679.39
See application file for complete search history.

(56) References Cited

U.S. PATENT DOCUMENTS

| | | | | |
|---|---|---|---|---|
| 6,297,951 | B1 * | 10/2001 | Lee ........................... | 361/685 |
| 6,813,148 | B2 * | 11/2004 | Hsu et al. ................ | 361/685 |
| 6,935,604 | B2 * | 8/2005 | Chen ......................... | 361/685 |
| 6,978,903 | B2 * | 12/2005 | Son et al. ................... | 211/26 |
| 7,369,403 | B2 * | 5/2008 | Chen et al. ............... | 361/685 |
| 2004/0012921 | A1 * | 1/2004 | Hidaka et al. ............ | 361/685 |
| 2006/0126288 | A1 * | 6/2006 | Chen et al. ............... | 361/685 |

\* cited by examiner

*Primary Examiner*—Jayprakash N Gandhi
*Assistant Examiner*—Adrian S Wilson
(74) *Attorney, Agent, or Firm*—Wei Te Chung

(57) ABSTRACT

A mounting apparatus for holding a storage device with a mounting hole comprises a bracket, an operating member, and a fastener. The bracket comprises a first sidewall connected to a second sidewall, and the second sidewall is generally perpendicular to the first sidewall. The storage device is disposed in the bracket. A fastener is pivotally attachable to the first sidewall of the bracket, and a mounting tab is formed from the fastener. An operating member is movably attached to the second sidewall of the bracket and connectable to the fastener. The fastener is pivoted by moving the operating member so that the mounting tab of the fastener is inserted into the mounting hole of the storage device for latching the storage device. Thus, the storage device is locked in the bracket.

18 Claims, 16 Drawing Sheets

MOUNTING APPARATUS FOR STORAGE DEVICE

1. FIELD OF THE INVENTION

The present invention relates to a mounting apparatus, and more particularly to a mounting apparatus for holding a storage device.

2. DESCRIPTION OF RELATED ART

An electronic apparatus, such as a computer, or a server, usually includes storage devices, such as hard disk drives, Compact Disk Read-Only Memory (CD-ROM) drives, Digital Video Disc (DVD) drives, and floppy disk drives. These devices are typically added to increase the functionality of the electronic apparatus as desired by a user. However, the installation of such devices in the electronic apparatus is usually labor-intensive.

The installation of a hard disk drive in a computer typically involves using screws to attach the hard disk drive to a bracket on a chassis of the computer. Usually, these screws are so small that it is difficult to install them. It is laborious and time-consuming to manipulate the screws. Additionally, because of their small size, the screws are easier to be dropped by an assembler into the computer. Some accidental damage may occur in the computer.

To address the aforementioned problems, a plurality of mounting apparatuses is invented to reduce the number of needed screws. For example, a pair of detachable rails is attached to opposite sides of a storage device with screws. The storage device slides into and is secured to a drive bracket. However, the screws have to be removed to detach the rails from the storage device before replacing the storage device.

What is desired, therefore, is a mounting apparatus which conveniently and securely holds a storage device in a bracket.

SUMMARY OF THE INVENTION

In one preferred embodiment, a mounting apparatus for holding a storage device with a mounting hole comprises a bracket, an operating member, and a fastener. The bracket comprises a first sidewall, and a second sidewall connected to the first sidewall. The storage device is disposed in the bracket. A fastener is pivotally attachable to the first sidewall of the bracket, and a mounting tab extends from the fastener. An operating member is movably attached to the second sidewall of the bracket and connectable to the fastener. The fastener is pivoted by moving the operating member thus the mounting tab of the fastener is inserted into the mounting hole of the storage device for latching the storage device. Thus, the storage device is secured in the bracket.

Other advantages and novel features will become more apparent from the following detailed description of preferred embodiments when taken in conjunction with the accompanying drawings, in which:

DETAILED DESCRIPTION OF THE INVENTION

Figure 1:
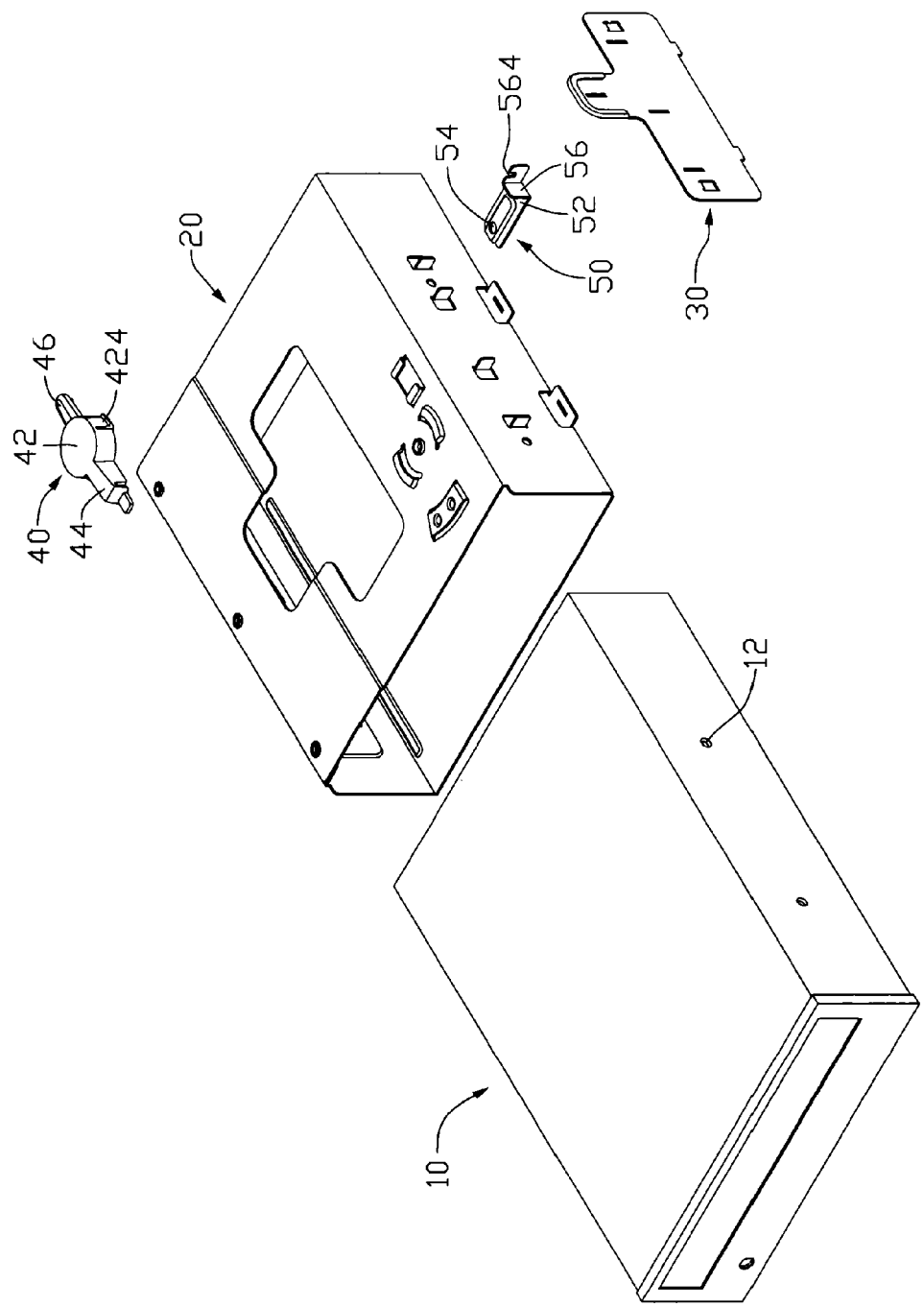
FIG. 1 is an exploded, isometric view of a mounting apparatus in accordance with a first preferred embodiment of the present invention, with a storage device, the mounting apparatus including a bracket, a fastener, and an operating member.

Referring to FIG. 1, in a first preferred embodiment of the invention, a mounting apparatus is provided for holding a storage device 10. The mounting apparatus includes a bracket 20, a fastener 30, an operating member 40, and a connecting member 50. Two mounting holes 12 are defined in a sidewall of the storage device 10. The fastener 30 is pivotally connected to the bracket 20. The fastener 30 and the operating member 40 are connected via the connecting member 50.

Figure 2:
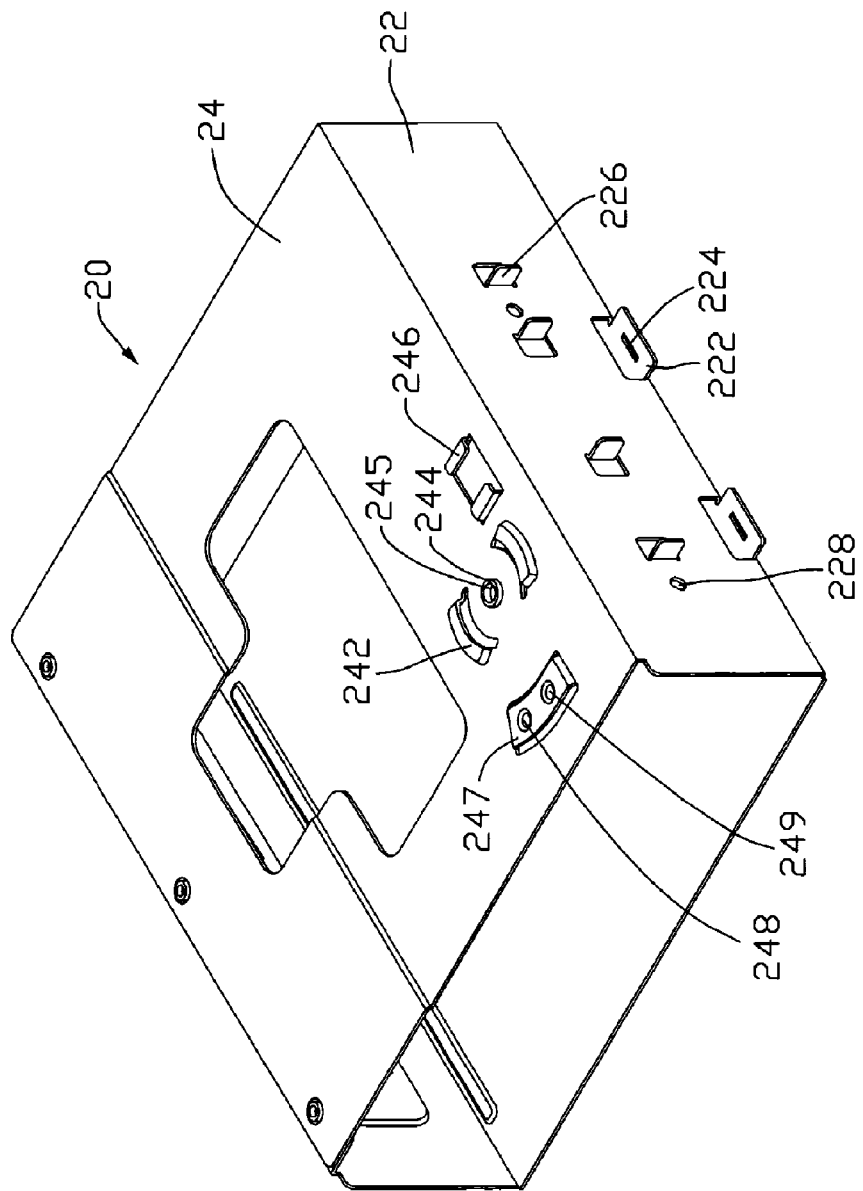
FIG. 2 is an enlarged view of the bracket of FIG. 1.

Referring also to FIG. 2, the bracket 20 is a box with two opposite sides being open. The bracket 20 includes a first sidewall 22 connected to a second sidewall 24, wherein the first sidewall 22 is perpendicular to the second sidewall 24. The first sidewall 22 forms two protruding portions 222 at a bottom portion thereof. An Insert hole 224 is defined in each protruding pardon 222. Four positioning portions 226 are outwardly formed on the first sidewall 22 and above the protruding portion 222. Two through holes 228 are defined in the first sidewall 22, corresponding to the mounting holes 12 of the storage device 10. The second sidewall 24 has a pair of curved retaining portions 242 formed thereon, with arcs of the retaining portions 242 opposite to each other and subtending a common center. A column 244 is formed on the common center with a pivot hole 245 defined therein. A pair of L-shaped guiding tabs 246 is formed outwardly from the second sidewall 24, and opposite to each other. The guiding tabs 246 are near one side of the retaining portions 242. A raised platform 247 is formed on the second sidewall 24, at an opposite side of the retaining portions 242. A first Indentation 248 and a second indentation 249 are defined in the raised platform 247.

Figure 3:
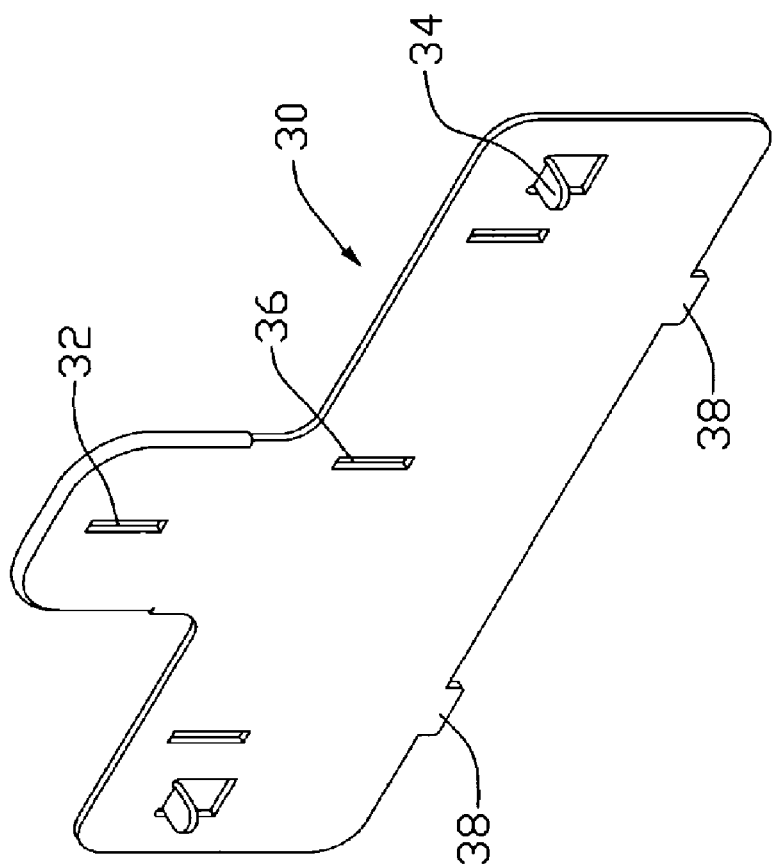
FIG. 3 is an enlarged view of the fastener of FIG. 1.

Referring to FIG. 3, the fastener 30 is generally T-shaped (viewed as an upside down T in FIG. 3). An upright through slot 32 is defined in an upper portion of the fastener 30. Two mounting tabs 34 are stamped out from the fastener 30, corresponding to the through holes 228 of the bracket 20. Three slits 36 are defined in the fastener 30, corresponding to three of the positioning portions 226 of the first sidewall 22 respectively. Two inserting portions 38 are formed on a lower portion of the fastener 30.

Figure 4:
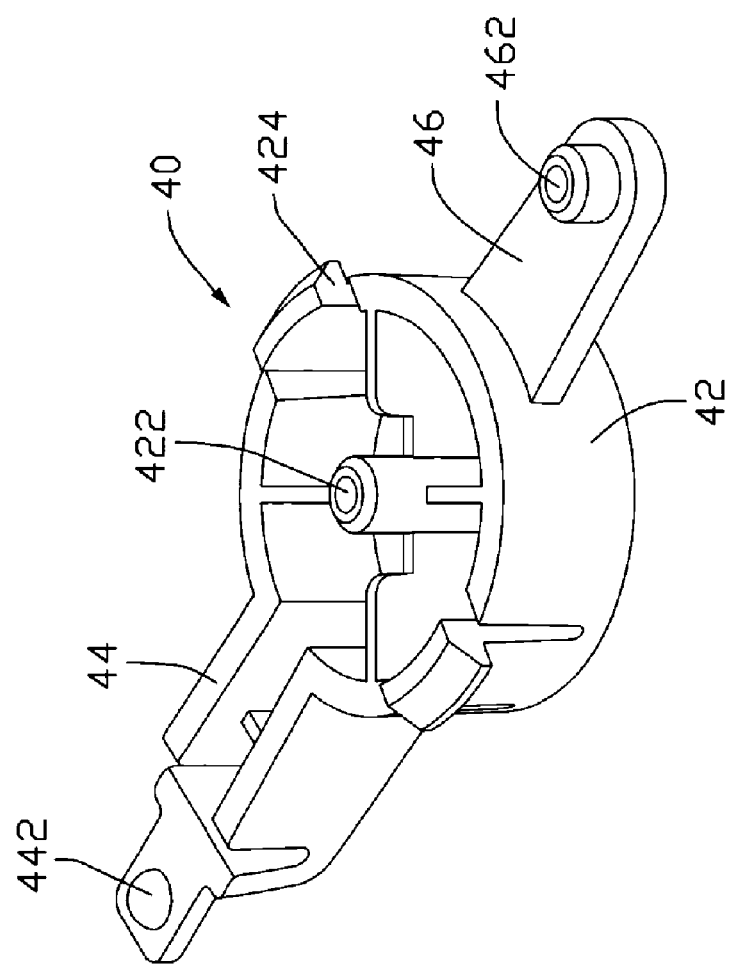
FIG. 4 is an enlarged inverted view of the operating member of FIG. 1.

Referring to FIGS. 1 and 4, the operating member 40 includes a main portion 42. The main portion 42 is columnar, and a bottom of the main portion 42 is open. A pivoting pole 422 extends down from a center of the bottom of the main portion 42. A plurality of reinforcing ribs is formed around the pivoting pole 422. Two elastic and opposite latching protrusions 424 are outwardly formed from the main portion 42. A handle 44 and a connecting portion 46 extend from two opposite sides of the main portion 42. A bottom of a distal end of the handle 44 extends out and forms a plate, and a convex protrusion 442 is formed on the bottom of the plate. A reinforcing rib is formed on the upside of the connecting portion 46. A connecting column 462 extends down from the connecting portion 46.

Referring to FIG. 1, the connecting member 50 includes a sliding portion 52, a through hole 54 defined in the sliding portion 52, and a generally L-shaped fastening portion 56 extending from the sliding portion 52. A cutout 564 is defined in the fastening portion 56.

Figure 5:
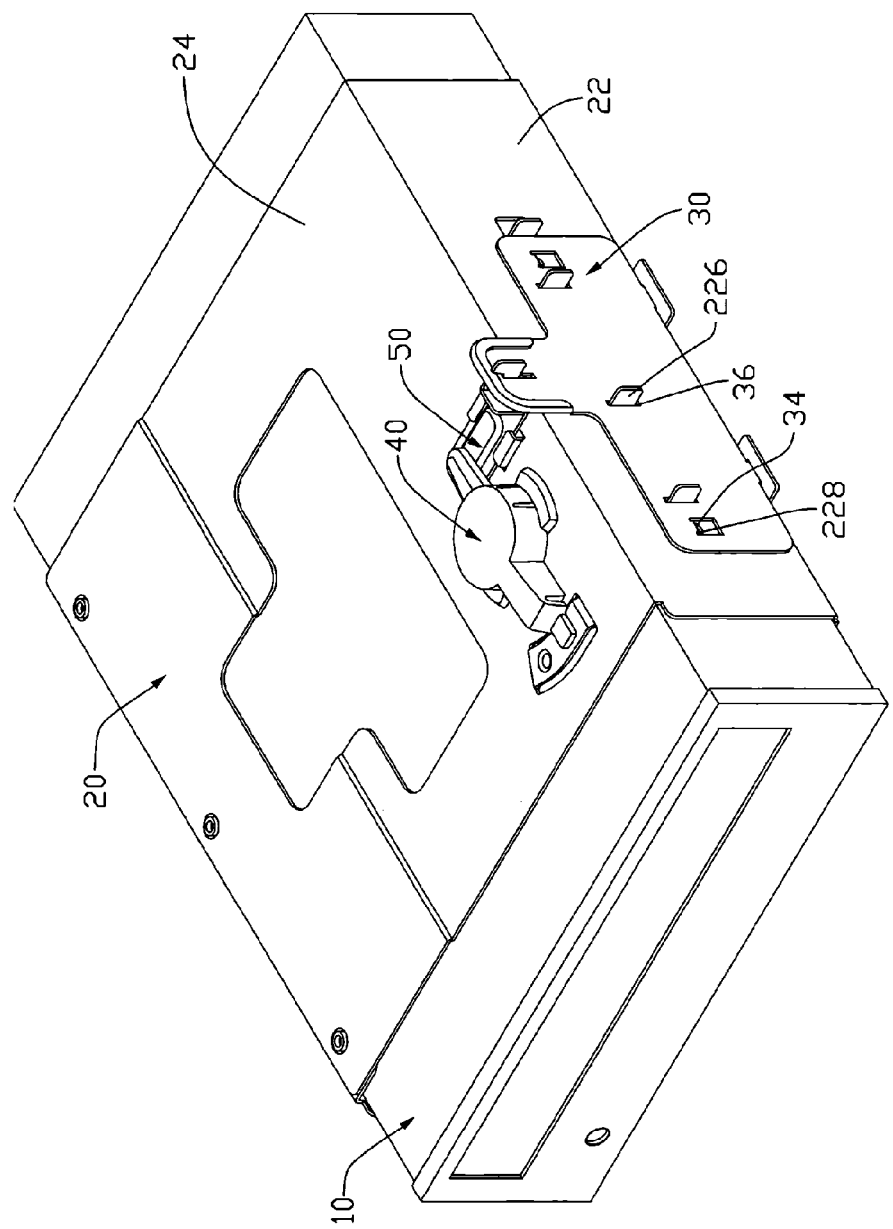
FIG. 5 is an assembled view of FIG. 1, the mounting apparatus in a locked state.

Referring to FIG. 1 to FIG. 5, in assembly, the pivoting pole 422 of the operating member 40 is pivotally engaged in the pivot hole 245 of the column 244 of the bracket 20. The latching protrusions 424 of the operating member 40 are received in the retaining portions 242 of the bracket 20. The connecting member 50 is slideably disposed on the second sidewall 24 of the bracket 20, with two opposite edges engaging in the guiding tabs 246. The operating member 40 is pivotally connected to the connecting member 50 in an unlocked position as shown in FIG. 5, by inserting the connecting column 462 of the connecting portion 46 of the operating member 40 into the through hole 54 of the connecting member 50. The fastening portion 56 of the connecting member 50 is inserted into the through slot 32 of the fastener 30, and then the cutout 564 of the fastening portion 56 engages with the fastener 30 at an upper edge of the through slot 32 of the fastener 30. The inserting portions 38 of the fastener 30 are inserted into the insert holes 224 of the bracket 20 respectively. Three of the positioning portions 226 of the first sidewall 22 extend through the three slits 36 of the fastener 30 respectively, and the rightmost positioning portion 226 of the first sidewall 22 blocks the right side of the fastener 30.

The storage device 10 is put into the bracket 20. Then, the handle 44 of the operating member 40 is rotated, turning the operating member 40 counter-clockwise round the pivoting pole 422 into a locked position. The connecting portion 46 pulls the connecting member 50 in causing the fastener 30 to pivot toward the first sidewall 22 of the bracket 20 until the mounting tabs 34 of the fastener 30 extend through the through holes 228 of the first sidewall 22 and into the corresponding mounting holes 12 of the storage device 10. Thus, the storage device 10 is mounted in the bracket 20. The convex protrusion 442 of the handle 44 is inserted into the second indentation 249 for locating the operating member 40.

Figure 6:
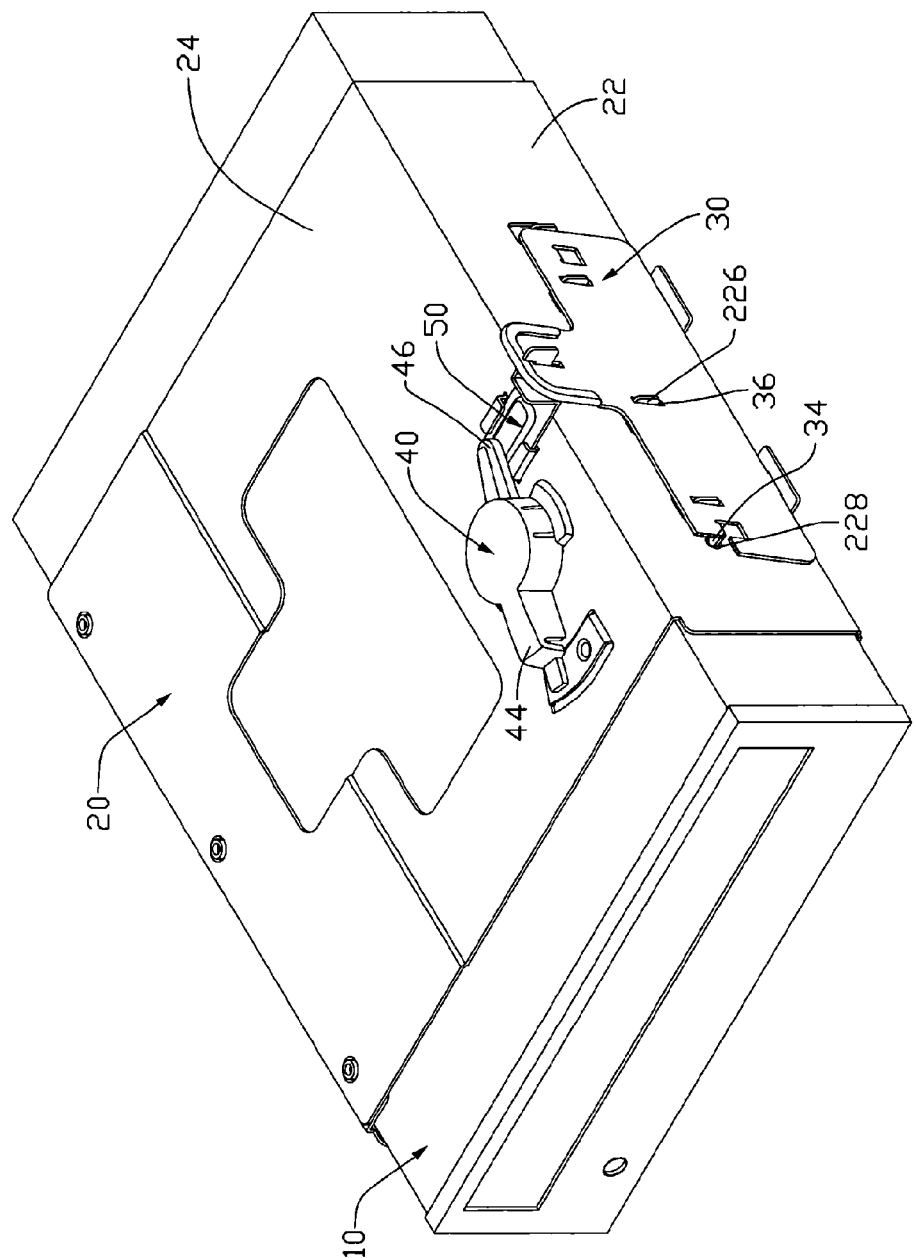
FIG. 6 is an assembled view of FIG. 1, the mounting apparatus in an unlocked state.

Referring to FIG. 6, to detach the storage device 10 from the bracket 20, the handle 44 of the operating member 40 is moved to rotate the operating member 40 clockwise to the unlocked position. The connecting portion 46 pushes the connecting member 50 causing the fastener 30 to pivot away from the first sidewall 22 of the bracket 20 until the mounting tabs 34 of the fastener 30 recede from the mounting holes 12 of the storage device 10. The convex protrusion 442 of the handle 44 is inserted into the first indentation 248 for locating the operating member 40. Thus, the storage device 10 is easily taken out from the bracket 20.

The positioning portions 226 of the first sidewall 22 are used for guiding the fastener 30 during installation or removal of the storage device 10.

Figure 7:
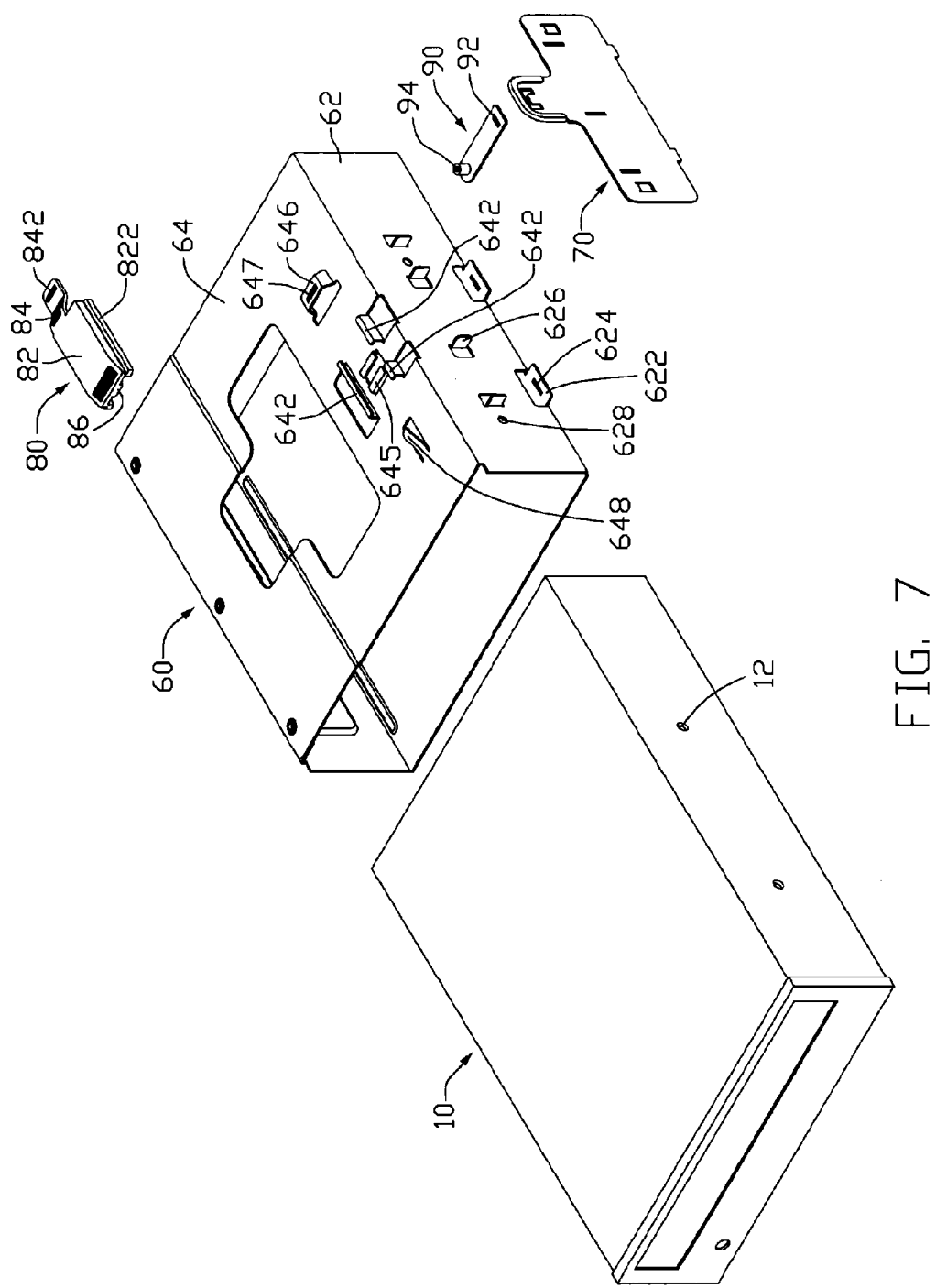
FIG. 7 is an exploded, isometric view of a mounting apparatus in accordance with a second preferred embodiment of the present invention, with a storage device, the mounting apparatus including a bracket, a fastener, and an operating member.

Referring to FIG. 7, a mounting apparatus in accordance with a second preferred embodiment of the present invention is shown. The mounting apparatus includes a bracket 60, a fastener 70, an operating member 80, and a connecting member 90. The fastener 70 is pivotally connected to the bracket 60. The fastener 70 and the operating member 80 are connected via the connecting member 90.

The bracket 60 is a box with two opposite sides being open. The bracket 60 includes a first sidewall 62 connected to a second sidewall 64, and the first sidewall 62 is perpendicular to the second sidewall 64. The first sidewall 62 forms two protruding portions 622 at a bottom portion thereof. An insert hole 624 is defined in each protruding portion 622. Four positioning portions 626 are outwardly formed on the first sidewall 62. Two through holes 628 are defined in the first sidewall 62 and above the protruding portion 622, and corresponding to the mounting holes 12 of the storage device 10. The second sidewall 64 has a pair of L-shaped retaining portions 642 formed thereon, and a gap is defined in the retaining portion 642 near a junction between the first sidewall 62 and the second sidewall 64. The second sidewall 64 has a pair of L-shaped guiding tabs 645 formed thereon between the retaining portions 642. A raised platform 646 defining a quadrate hole 647 is formed on the second sidewall 64 near a left side of the guiding tabs 645. An elastic finger 648 is formed on the second sidewall 64 at an opposite side of the guiding tabs 645.

Figure 8:
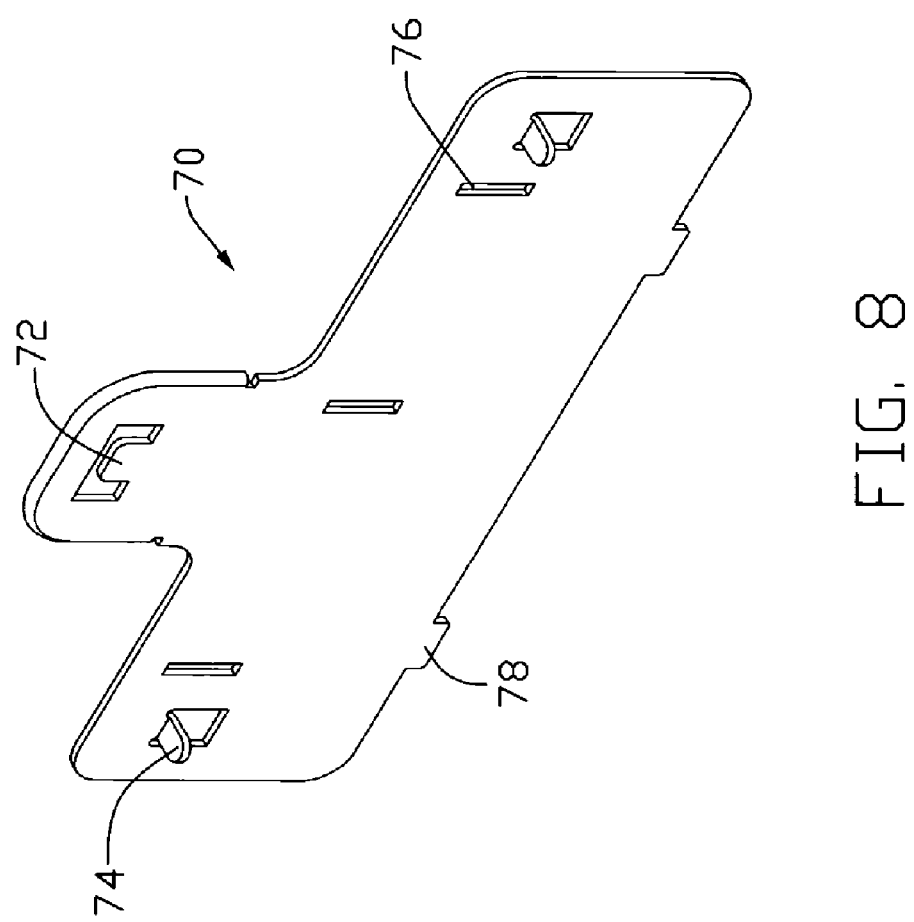
FIG. 8 is an enlarged view of the bracket of FIG. 7.

Referring to FIG. 8, the fastener 30 is generally T-shaped (viewed as an upside down T in FIG. 8). A U-shaped slot is defined in an upper portion of the fastener 70, and a locking piece 72 is extruded in the U-shaped slot. Two mounting tabs 74 are stamped out from the fastener 70, corresponding to the through holes 628 of the bracket 60. Three slits 76 are defined in the fastener 70, corresponding to three of the positioning portions 626 of the first sidewall 62 respectively. Two inserting portions 78 are formed on a lower portion of the fastener 70.

Figure 9:
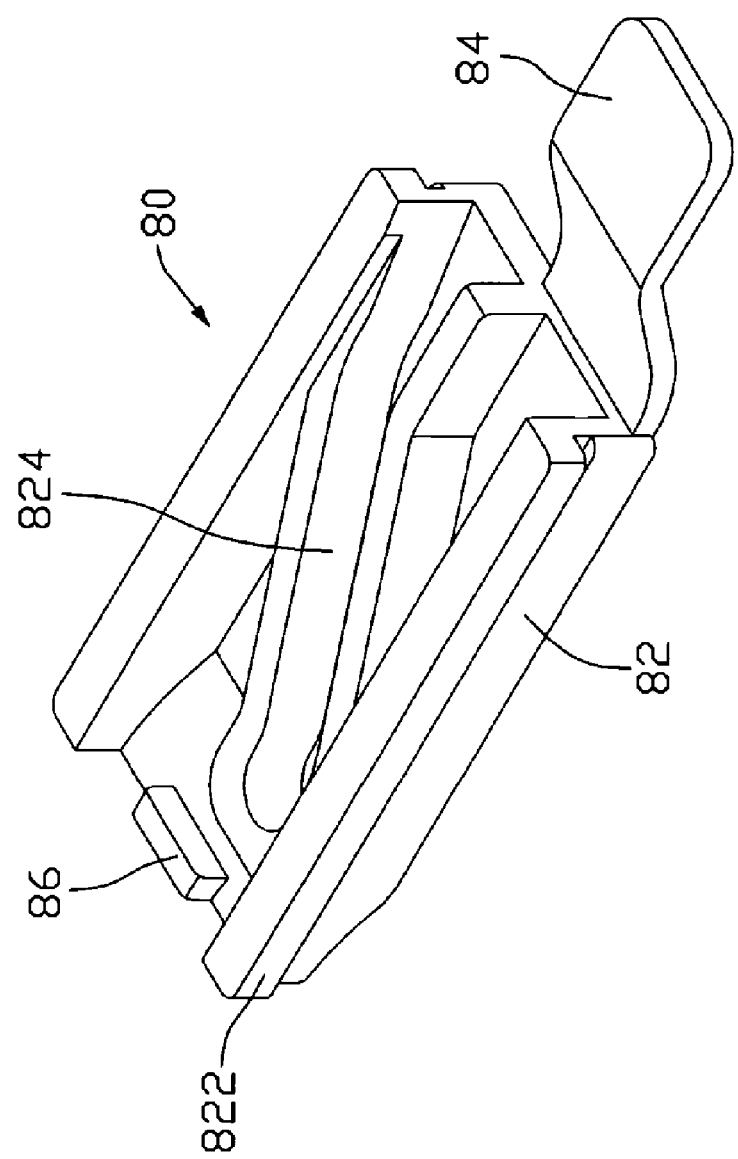
FIG. 9 is an enlarged inverted view of the operating member of FIG. 7.

Referring to FIGS. 7 and 9, the operating member 80 includes a main portion 82 with a bottom thereof being open. A guiding portion 822 is formed from each side of the main portion 82. A pressing portion 84 extends from an end of the main portion 82, and forms a tab 842. A latching protrusion 86 is formed from an opposite end of the main portion 82. A slanting slot 824 is defined in the bottom of the main portion 42, and an entry of the slanting slot 824 is near the pressing portion 84.

Referring to FIG. 7, the connecting member 90 includes a through hole 92 and a pole 94. The through hole 92 is defined in the connecting member 90, and the pole 94 extends out from the connecting member 90.

Figure 10:
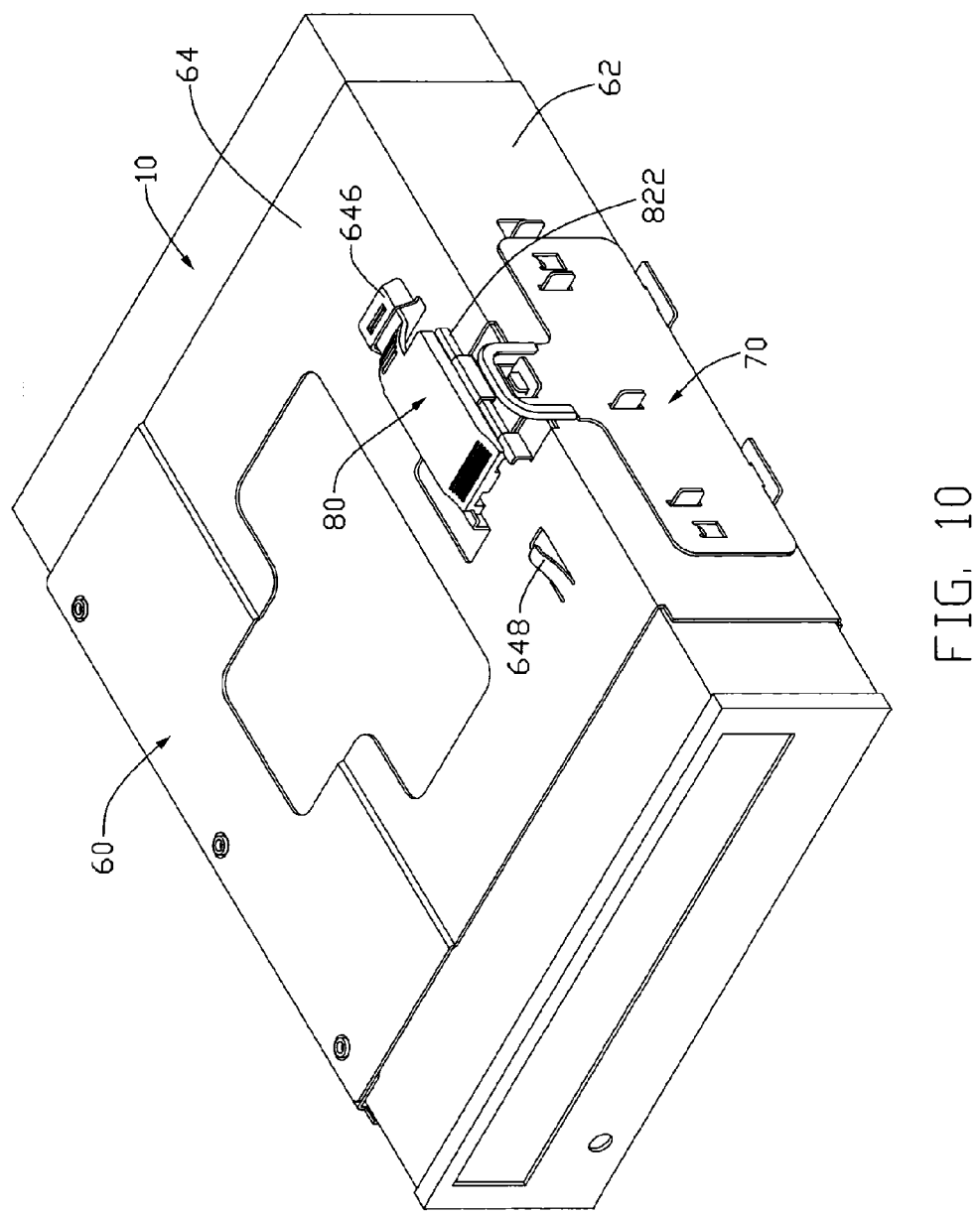
FIG. 10 is an assembled view of FIG. 7, the mounting apparatus in a locked state.

Referring also to FIG. 10, in assembly, the connecting member 90 is disposed in the guiding tabs 645 of the second sidewall 64 of the bracket 60. Then the operating member 80 is placed over the elastic finger 648 of the bracket 60, with the pressing portion 84 pointing towards the raised platform 646, and the guiding portions 822 aligned with the retaining portions 642. The operating member 80 is pressed down and toward the raised platform 646 to be slideably received in and retained by the retaining portions 642. During this time, the elastic finger 648 is first depressed then rebounds when the operating member 80 passes beyond it, thus trapping the operating member 80 within the retaining portions 642 and preventing accidental withdrawal of the operating member 80 when used. At this time, the operating member 80 is positioned just short of the raised platform 646 in an unlocked position. The pole 94 of the connecting member 90 is engaged in the entry of the slanting slot 824 of the operating member 80 from the entry of the slanting slot 824. The locking piece 72 of the fastener 70 is engaged in the through hole 92 of the connecting member 90, and the inserting portions 78 of the fastener 70 are engaged in the insert holes 624 of the bracket 60 respectively. Three of the positioning portions 626 of the first sidewall 62 extend through the slits 76 of the fastener 70 respectively, and the rightmost positioning portions 626 of the first sidewall 62 blocks the right side of the fastener 70.

The storage device 10 is put into the bracket 60. Then, the operating member 80 is moved toward and received by the raised platform 646 of the second sidewall 64 of the bracket 60 to a locked portion. The pole 94 of the connecting member 90 slides along the slanting slot 824 of the operating member 80 to a retracted position, and the connecting member 90 pivots the fastener 70 toward the first sidewall 62 of the bracket 60 until the mounting tabs 74 of the fastener 70 extend through the through holes 628 of the first sidewall 62 and into the corresponding mounting holes 12 of the storage device 10. Thus the storage device 10 is mounted in the bracket 60. The tab 842 of the pressing portion 84 of the operating member 80 is locked into the quadrate hole 647 of the raised platform 646 for positioning the operating member 80.

Figure 11:
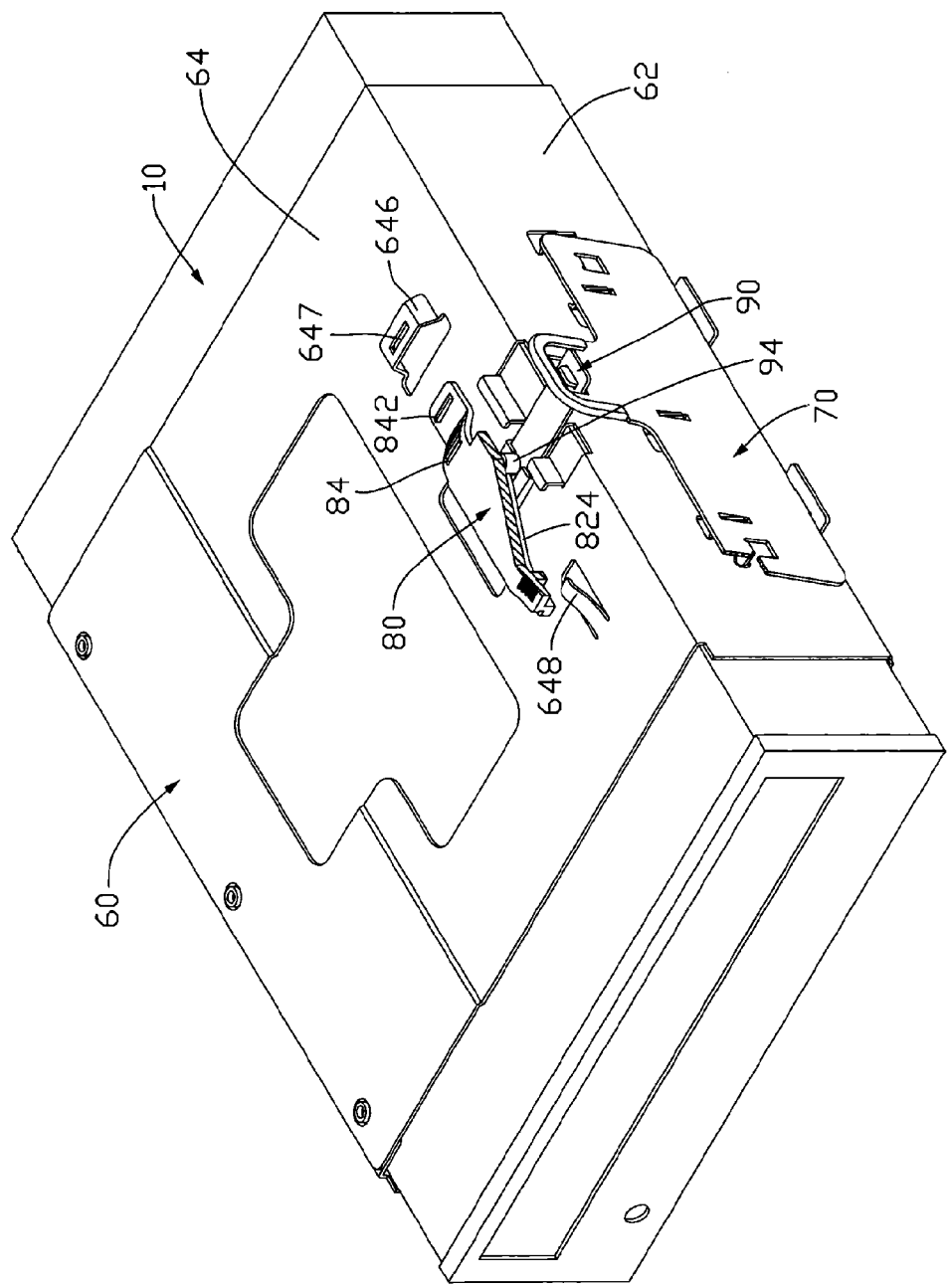
FIG. 11 is an assembled view of FIG. 7, the mounting apparatus in an unlocked state.

Referring to FIG. 11, to detach the storage device 10 from the bracket 60, the pressing portion 84 of the operating member 80 is pressed to unlatch the operating member 80, then the operating member 80 is withdrawn from the raised platform 646 to make the pole 94 of the connecting member 90 slide along the slanting slot 824 of the operating member 80 to the extended position until the latching protrusion 86 of the operating member 80 is stopped by the elastic finger 648 of the second sidewall 64. Thus the pole 94 pushes the connecting member 90 causing the fastener 70 to pivot away from the first sidewall 62 of the bracket 60 until the mounting tabs 74 of the fastener 70 recede from the mounting holes 12 of the storage device 10. Then the storage device 10 is easily taken out from the bracket 60.

The positioning portions 626 of the first sidewall 62 are used for guiding the fastener 70 during installation or removal of the storage device 10.

Figure 12:
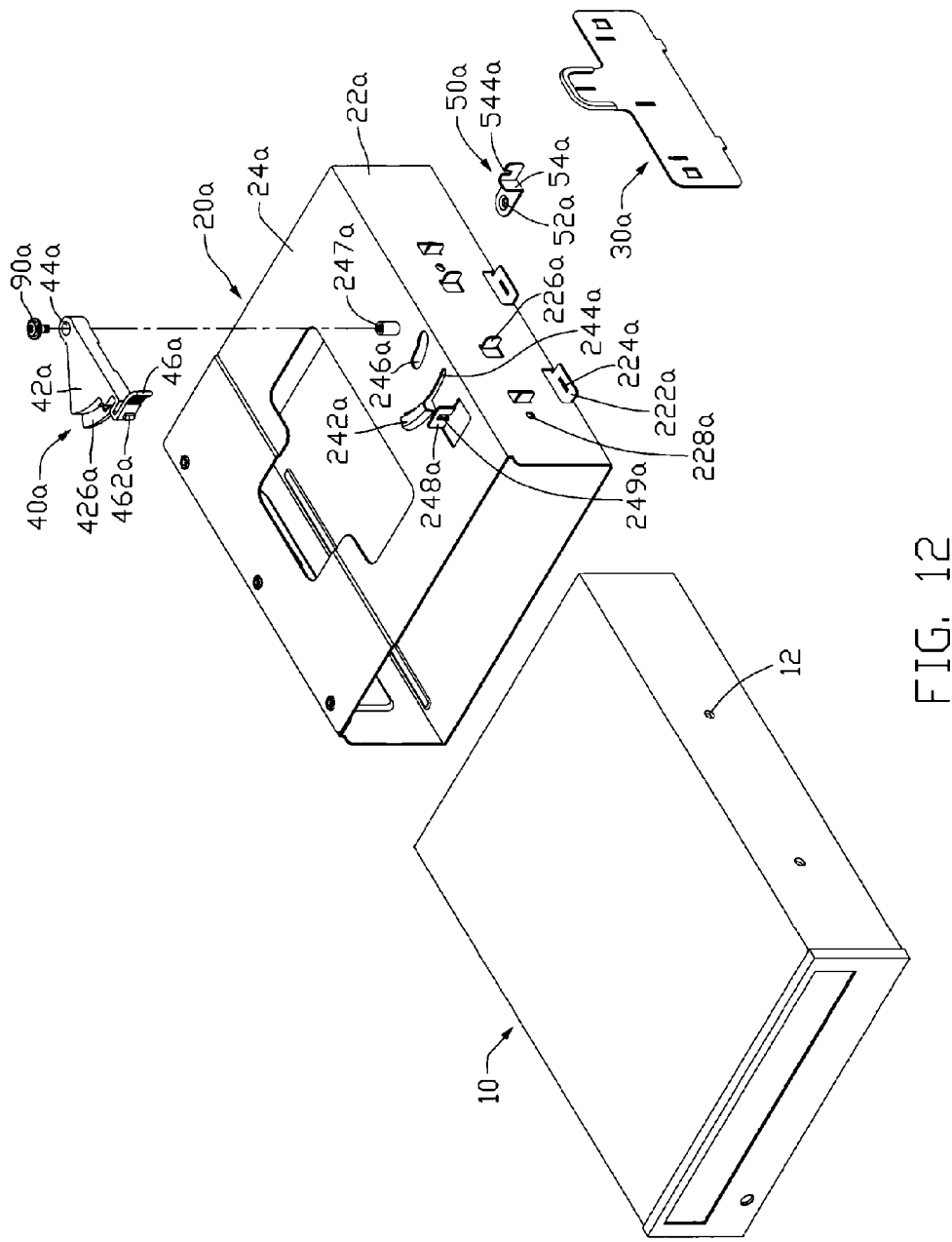
FIG. 12 is an exploded, isometric view of a mounting apparatus in accordance with a third preferred embodiment of the present invention, with a storage device, the mounting apparatus including a bracket, a fastener, and an operating member.

Referring to the FIG. 12, a mounting apparatus in accordance with a third preferred embodiment of the present invention is shown. The mounting apparatus includes a bracket 20a, a fastener 30a, an operating member 40a, and a connecting member 50a. Two mounting holes 12 are defined in the sidewall of the storage device 10. The fastener 30a is pivotally connected to the bracket 20a. The fastener 30a and the operating member 40a are connected via the connecting member 50a.

The bracket 20a is a box with two opposite sides being open. The bracket 20a includes a first sidewall 22a connected to a second sidewall 24a, wherein the first sidewall 22a is perpendicular to the second sidewall 24a. The first sidewall 22a forms two protruding portions 222a at a bottom portion thereof. An insert hole 224a is defined in each protruding portion 222a. Four positioning portions 226a are outwardly formed on the first sidewall 22a. Two through holes 228a are defined in the first sidewall 22a, and corresponding to the mounting holes 12 of the storage device 10. The second sidewall 24a forms an L-shaped guiding tab 242a thereon and defines a curved slot 244a therein, with arcs of the guiding tab 242a and the curved slot 244a having a common center. An arc hole 246a is defined in the second sidewall 24a at one side of the guiding tab 242a, having a common center with the curved slot 244a. A hollow cylinder 247a is formed on the common center. A protruding portion 248a is formed on the second sidewall 24a at an opposite side of the guiding tab 242a, with a mounting slot 249a defined therein.

Figure 13:
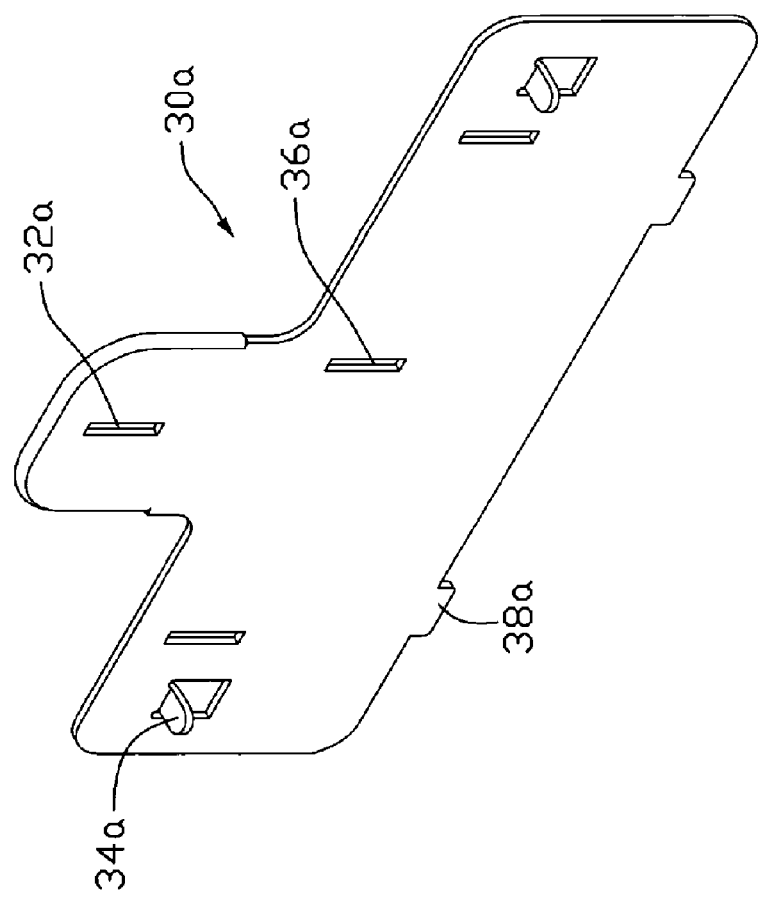
FIG. 13 is an enlarged view of the bracket of FIG. 12.

Referring to FIG. 13, the fastener 30a is generally T-shaped (viewed as an upside down T in FIG. 13). An upright through slot 32a is defined in an upper portion of the fastener 30a. Two mounting tab 34a are stamped out from the fastener 30a, corresponding to the through holes 228a of the bracket 20a. Three slits 36a are defined in the fastener 30a, corresponding to three of the positioning portions 226a of the first sidewall 22a respectively. Two inserting portions 38a are formed on a lower portion of the fastener 30a.

Figure 14:
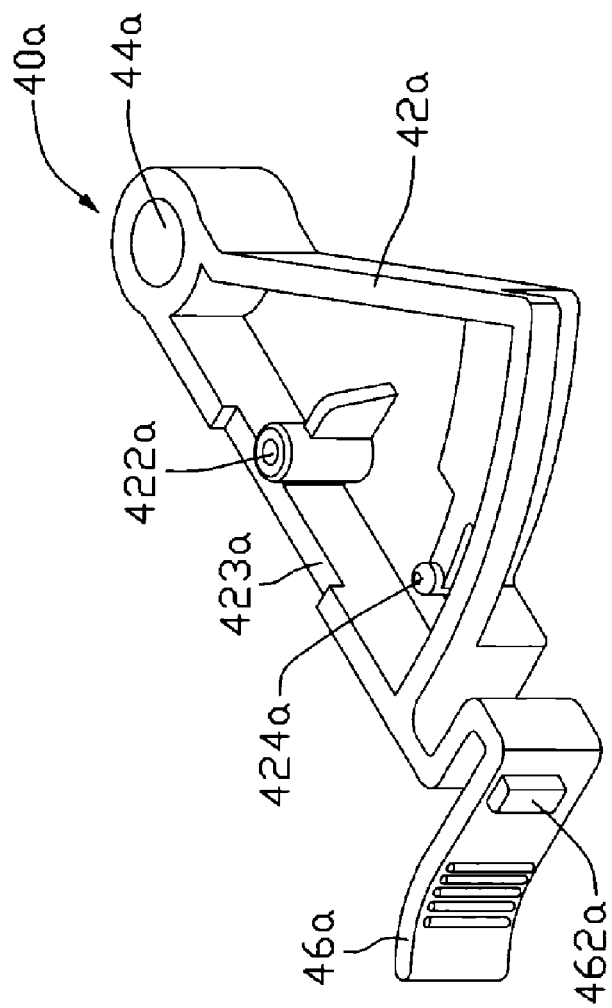
FIG. 14 is an enlarged inverted view of the operating member of FIG. 12.

Referring to FIGS. 12 and 14, the operating member 40a includes a fan-shaped main portion 42a, with a bottom of the main portion 42a being open. A pivoting pole 422a extends down from the bottom of the main portion 42a, and a cutout 423a is defined in one straight fringe of the main portion 42a. A pivot hole 44a is defined in an end of the main portion 42a. An S-shaped handle 46a extends from the straight fringe of the main portion 42a, and a latching protrusion 462a is formed thereon. An arc shaped piece is formed from an opposite straight fringe of the main portion 42a in the opening of the main portion 42a, and a tab 424a extends from a distal end thereof. A curved edge 426a extends out from an arc shaped fringe of the main portion 42a.

Referring to FIG. 12, the connecting member 50a includes a pole 52a and a fastening portion 54a. The pole 52a extends down from an end of the connecting member 50a, and the fastening portion 54a is formed from an opposite end of the connecting member 50a. A cutout 544a is defined in the fastening portion 56.

Figure 15:
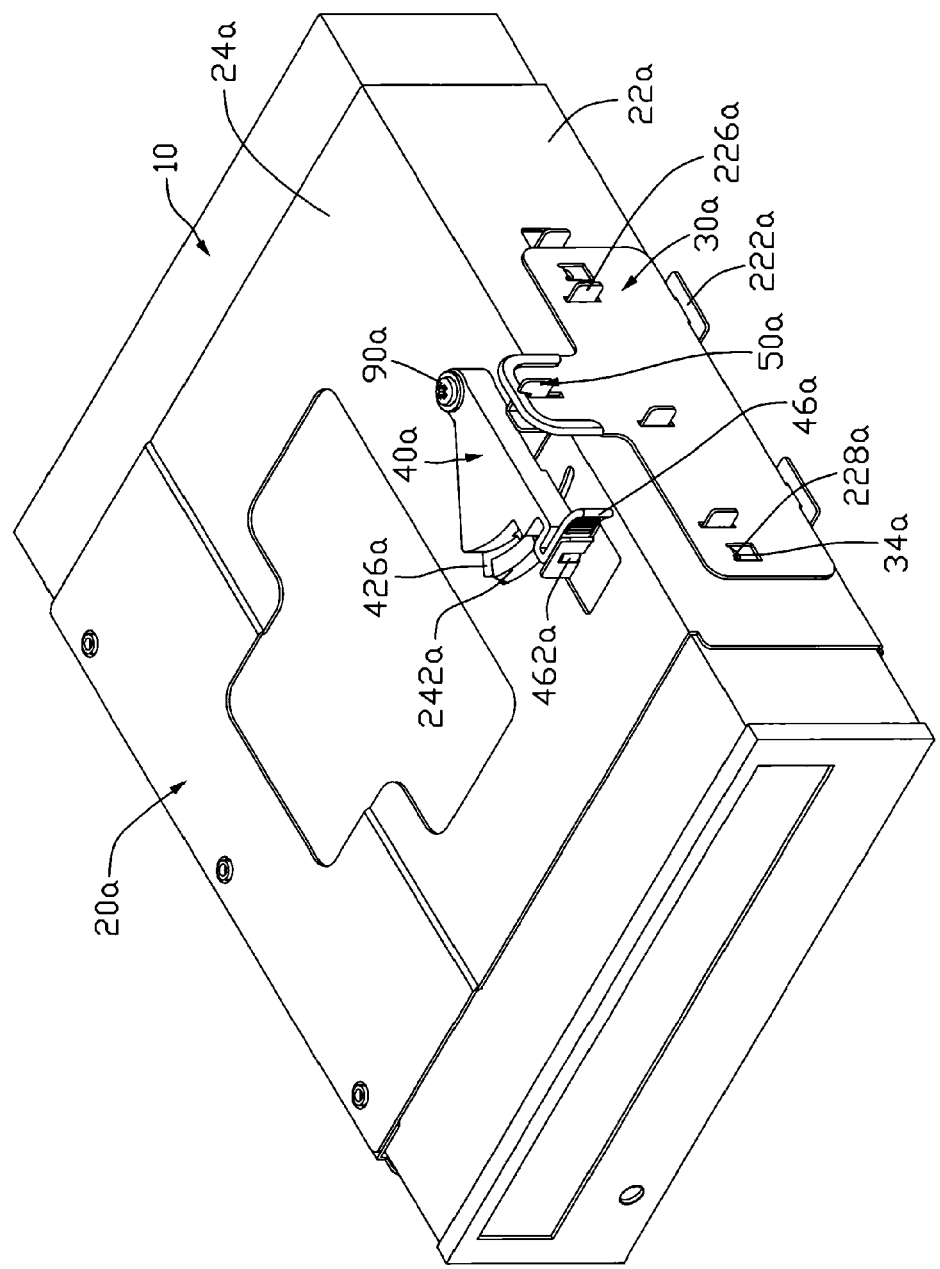
FIG. 15 is an assembled view of FIG. 12, the mounting apparatus in a locked state.

Referring also to FIG. 15, in assembly, the connecting member 50 is inserted into the operating member 40 through the cutout 423a of the operating member 40a, and pivotally connected to the pivoting pole 422a of the operating member 40a via the pole 52a of the connecting member 50a. The fastening portion 54a of the connecting member 50a is inserted into the through slot 32a of the fastener 30a, and then the cutout 564a of the fastening portion 54a engages with the fastener 30a at an upper edge of the through slot 32a of the fastener 30a. The inserting portions 38a of the fastener 30a are inserted into the insert holes 224a of the bracket 20a respectively. Three of the positioning portions 226a of the first sidewall 22a extend through the slits 36a of the fastener 30a respectively, and the rightmost positioning portion 226a of the first sidewall 22a blocks the right side of the fastener 30a. The pivot hole 422a of the operating member 40a is pivotally attached to the hollow cylinder 247a of the second sidewall 24a, and a fastener such as a bolt 90a is screwed into the hollow cylinder 247a to fix the operating member 40a to the bracket 20a. The curved edge 426a of the operating member 40 is fastened slideably under the guiding tab 242a of the second sidewall 24a for locating the operating member 40a. The tab 424a of the operating member 40a is engaged in the curved slot 244a of the second sidewall 24a for guiding the operating member 40a. At this time the operating member 40a is in an unlocked position as shown in FIG. 16.

The storage device 10 is put into the bracket 20a. Then, using the handle 46a, the operating member 40a is rotated, clockwise round the hollow cylinder 247a of the second sidewall 24a in a locked position. The pivoting pole 422a of the operating member 40 pulls the connecting member 50a inward causing the fastener 30a to pivot toward the first sidewall 22a of the bracket 20a until the mounting tabs 34a of the fastener 30a extend through the through holes 228a of the first sidewall 22a and into the corresponding mounting holes 12 of the storage device 10. Thus, the storage device 10 is mounted in the bracket 20a. The latching protrusion 462a of the handle 46a is engaged in the mounting slot 249a for blocking the operating member 40a.

Figure 16:
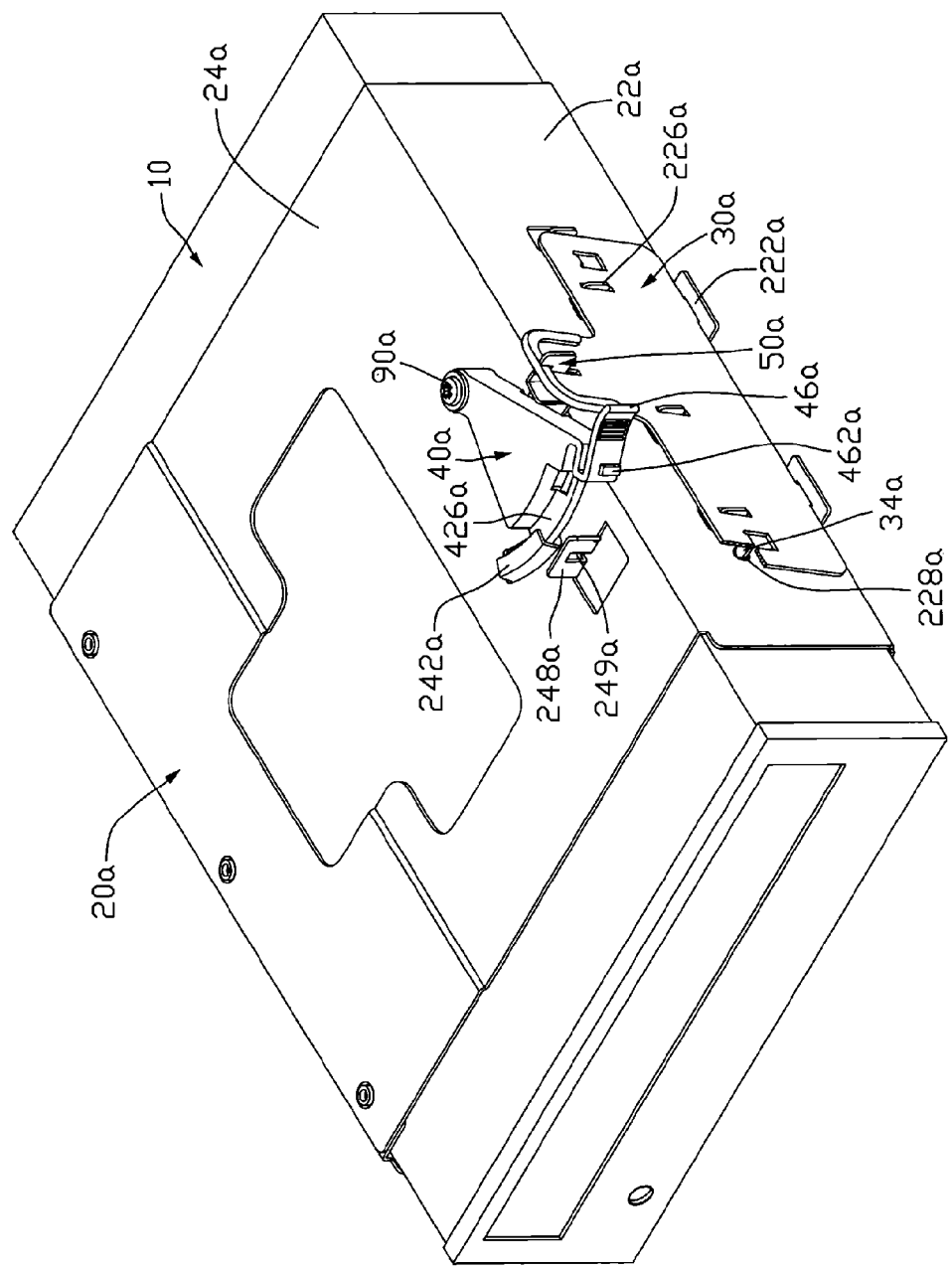
FIG. 16 is an assembled view of FIG. 12, the mounting apparatus in an unlocked state.

Referring to FIG. 16, to detach the storage device 10 from the bracket 20a, the handle 46a is used to rotate the operating member 40a counter-clockwise to an unlocked position. The pivoting pole 422a pushes the connecting member 50a causing the fastener 30a to pivot away from the first sidewall 22a of the bracket 20a until the mounting tabs 34a of the fastener 30a recede from the mounting holes 12 of the storage device 10. Thus, the storage device 10 is easily taken out from the bracket 20a.

The positioning portions 226a of the first sidewall 22a are used for guiding the fastener 30a during installation or removal of the storage device 10.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A mounting apparatus for holding a storage device with a mounting hole, the mounting apparatus comprising:
    a bracket comprising a first sidewall connected to a second sidewall, the storage device being disposed in the bracket;
    a fastener being pivotally attached to the first sidewall of the bracket and a mounting tab being formed thereon;
    an operating member being movably attached to the second sidewall of the bracket; and
    a connecting member comprising a first connecting end and a second connecting end, the first connecting end movably connecting with the fastener the second connecting end movably connecting with the operating member;
    wherein the operating member is operated to drive the connecting member to actuate the fastener to pivot toward or away from the first sidewall of the bracket, so that the mounting tab of the fastener is inserted in or withdrawn from the mounting hole of the storage device according to a corresponding pivot action of the fastener for latching and unlatching of the storage device.

2. The mounting apparatus as claimed in claim 1, wherein a fastening portion with a cutout is formed from the connecting member, and a through slot is defined in the fastener, the fastening portion of the connecting member being inserted into the through slot of the fastener, the cutout of the fastening portion engaging with the fastener at an upper edge of the through slot of the fastener.

3. The mounting apparatus as claimed in claim 1, wherein a through hole is defined in the connecting member, and a connecting column is formed from the operating member, the connecting member being pivotally connected to the connecting column of the connecting portion via the through hole of the connecting member.

4. The mounting apparatus as claimed in claim 1, wherein a pair of guiding tabs is formed on the second sidewall, and the connecting member is disposed slideably in the pair of guiding tabs.

5. The mounting apparatus as claimed in claim 1, wherein a through hole is defined in the connecting member, and a locking piece extends from the fastener, the locking piece being engaged in the through hole of the connecting member.

6. The mounting apparatus as claimed in claim 1, wherein a pole is formed on the connecting member, and a slanting slot is defined in the operating member, the pole of the connecting member sliding along the slanting slot of the operating member.

7. The mounting apparatus as claimed in claim 1, wherein an inserting portion extends from the fastener, and a protruding portion with an insert hole extends from the first sidewall, the inserting portion being pivotally engaged in the insert hole.

8. The mounting apparatus as claimed in claim 7, wherein a slot is defined in the fastener, and a positioning portion is formed on the first sidewall, the positioning portion of the first sidewall extending through the slot for guiding the fastener.

9. The mounting apparatus as claimed in claim 1, wherein a through hole is defined in the first sidewall corresponding to the mounting hole of the storage device.

10. The mounting apparatus as claimed in claim 1, wherein a pivoting pole is formed on the operating member, and a pivot hole is defined in the second sidewall, the operating member being pivotally attached to the pivot hole via the pivoting pole.

11. The mounting apparatus as claimed in claim 10, wherein a handle with a convex protrusion extends from the operating member, and an indentation is defined in the second sidewall, the convex protrusion of the handle being engaged in the indentation for locating the operating member.

12. The mounting apparatus as claimed in claim 10, wherein a pair of latching protrusions extends from the operating member, and a pair of retaining portions is formed on the second sidewall, the pair of latching protrusions being locked in the pair of retaining portions.

13. The mounting apparatus as claimed in claim 1, wherein a pivot hole is defined in the operating member, and a column is formed on the second sidewall, the operating member being pivotally attached to the column via the pivot hole.

14. The mounting apparatus as claimed in claim 1, wherein a pair of retaining portions are formed on the second sidewall, and two guiding portions extend from opposite sides of the operating member, the guiding portions of the operating member being slideably received in the retaining portions of the second sidewall.

15. A mounting apparatus assembly comprising:
    a bracket containing a storage device therein, comprising a first sidewall with a through hole and a second sidewall connected to the first sidewall;
    an operating member being movably attached to the second sidewall of the bracket;
    a fastener comprising a pivot end, a connect end, and a mounting tab, the pivot end being pivotally attached to first sidewall of the bracket, the connect end being connected to the operating member; and a connecting member comprising a first connecting and a second connecting end, the first connecting end movably connecting with the fastener, the second connecting end movably connecting with the operating member,
    wherein the operating member is operated to drive the connecting member causing the fastener to move toward or away from the first sidewall of the bracket, so that the mounting tab of the fastener is inserted in or withdrawn from the through hole of the first sidewall according to a corresponding pivot action of the fastener for latching and unlatching the storage device.

16. A electronic device, comprising:
    a storage device;
    a bracket comprising two sidewalls being not at a same plane, the storage device being disposed in the bracket;

a fastener being pivotally attached to one of the sidewalls of the bracket;

an operating member being movably attached to another of the sidewalls of the bracket;

a connecting member comprising a first connecting end and a second connecting end, the first connecting end movably connecting with the fastener the second connecting end movably connecting with the operating member;

wherein the fastener is pivoted toward or away from the first sidewall actuated by manipulating the operating member to drive the connecting member for latching and unlatching of the storage device.

17. The mounting apparatus as claimed in claim 16, wherein a mounting hole is defined in the storage device, and a mounting tab is formed on fastener, the mounting tab is inserted into the mounting hole for latching the storage device.

18. The mounting apparatus as claimed in claim 16, wherein the two sidewalls are perpendicular to each other.

* * * * *

UNITED STATES PATENT AND TRADEMARK OFFICE
CERTIFICATE OF CORRECTION

PATENT NO. : 7,639,487 B2 Page 1 of 1
APPLICATION NO. : 11/309423
DATED : December 29, 2009
INVENTOR(S) : Liang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 309 days.

Signed and Sealed this

Ninth Day of November, 2010

David J. Kappos
*Director of the United States Patent and Trademark Office*